US007343081B1

(12) United States Patent
Austin

(10) Patent No.: US 7,343,081 B1
(45) Date of Patent: Mar. 11, 2008

(54) IDENTIFICATION OF VIDEO STORAGE MEDIA

(75) Inventor: Kenneth Austin, Hartford (GB)

(73) Assignee: 4TV Limited (GB)

( * ) Notice: Subject to any disclaimer, the term of this patent is extended or adjusted under 35 U.S.C. 154(b) by 0 days.

(21) Appl. No.: 09/744,055

(22) PCT Filed: Jul. 20, 1999

(86) PCT No.: PCT/GB99/02338

§ 371 (c)(1),
(2), (4) Date: Mar. 30, 2001

(87) PCT Pub. No.: WO00/05718

PCT Pub. Date: Feb. 3, 2000

(30) Foreign Application Priority Data

Jul. 20, 1998 (GB) ................................. 9815638.3

(51) Int. Cl.
*H04N 5/91* (2006.01)
(52) U.S. Cl. .......................................... 386/46; 386/83
(58) Field of Classification Search .................. 386/46, 386/52, 83, 95, 96
See application file for complete search history.

(56) References Cited

U.S. PATENT DOCUMENTS

| 3,930,246 | A | * | 12/1975 | Campbell .................... 340/511 |
| 5,109,284 | A | * | 4/1992 | Jung ............................ 386/96 |
| 5,532,833 | A | | 7/1996 | Hong et al. |
| 5,815,631 | A | * | 9/1998 | Sugiyama et al. ............. 386/46 |
| 6,351,595 | B1 | * | 2/2002 | Kim ............................. 386/46 |
| 6,850,693 | B2 | * | 2/2005 | Young et al. .................. 386/83 |

FOREIGN PATENT DOCUMENTS

| EP | 0 472 806 A2 | 3/1991 |
| EP | 0 692 790 A2 | 7/1995 |
| EP | 0 713 334 A2 | 11/1995 |
| EP | 0 731 469 A2 | 2/1996 |
| EP | 0 838 820 A2 | 10/1997 |
| EP | 0913997 A2 * | 5/1999 |
| WO | WO 92/04801 | 3/1992 |
| WO | WO 97/40454 | 10/1997 |

OTHER PUBLICATIONS

"Automation of Systems Enabling Search on Stored Video Data", Alan Hanjalic, Marco Ceccarelli, Reginald L. Lagendijk and Jan Biemond, authors; Delft University of Technology, The Netherlands.
Patent Cooperation Treaty International Search Report PCT/GB99/02338, Sep. 12, 1999 (3 pp.).
Patent Cooperation Treaty Written Opinion (PCT Rule 66), PCT/GB99/02338, Aug. 29, 2000 (9 pp.).

* cited by examiner

*Primary Examiner*—Huy Nguyen
(74) *Attorney, Agent, or Firm*—Olson & Cepuritis, Ltd.

(57) ABSTRACT

A method of generating data for identifying a video storage media comprising the steps of (1) generating from the contents of the media a data sequence representing the picture and/or the audio and/or data content of the video medium, (2) combining said data sequence with position information and/or picture and/or text and/or data or other information. It also provides a system for controlling a video recorder or other media device for selective enabling and disabling of associated functions. A graphical user interface is adapted to display information relating to television program content and/or data content from other sources such as the Internet and video recorder or other media device content and to display information relating to one or more video tapes or other media contents.

4 Claims, 9 Drawing Sheets

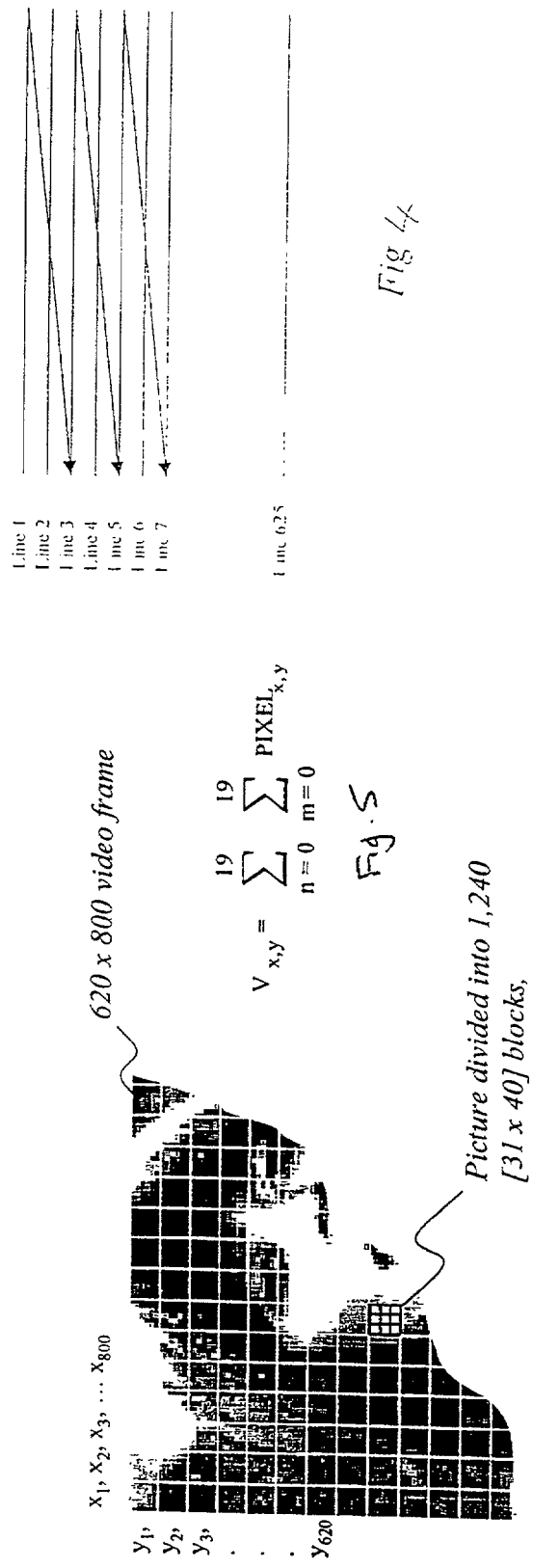
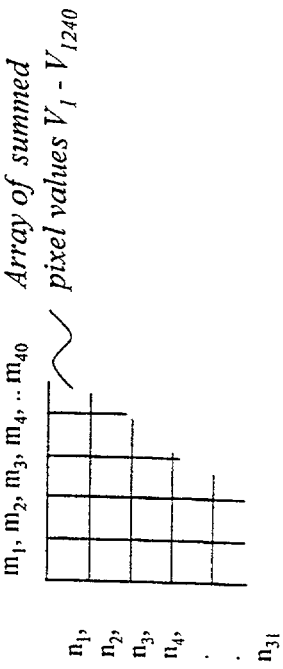
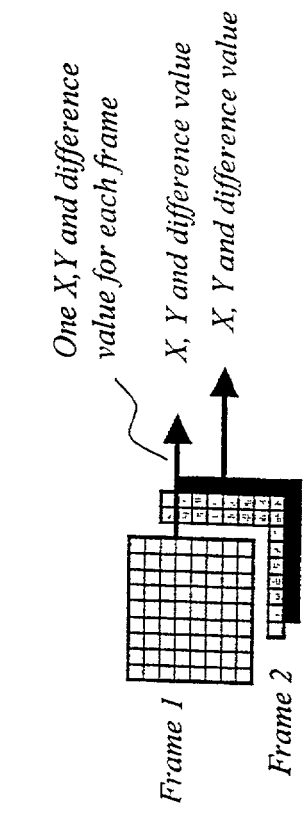
$$V_{x,y} = \sum_{n=0}^{19} \sum_{m=0}^{19} PIXEL_{x,y}$$
Fig. 5
Fig. 3 — Picture divided into 1,240 [31 x 40] blocks, each block contains 400 [20 x 20] pixels
Fig. 4
Fig. 6 — One X,Y and difference value for each frame
Fig. 7 — Array of summed pixel values $V_1 - V_{1240}$

IDENTIFICATION OF VIDEO STORAGE MEDIA

TECHNICAL FIELD

The present invention relates to a method and apparatus for identifying video storage media recorded on video tape or other video storage media, and to an index for same and a method of generating same.

BACKGROUND OF THE INVENTION

In our co-pending U.K. Patent Application No. 9802415.1 we describe among other things a method of applying frame identification codes to video tape by recording data in the vertical blanking interval between each frame or at pre-scribed intervals. The frame identification code makes it possible to identify a particular location on the tape. This in turn makes it possible to locate a particular item recorded on the tape using an automatic tape control system which reads the tape frame coding. By this means the tape can be moved backwards and forwards until the desired location is found. Coding is used in association with an index of the contents of the tape correlated to the codes recorded on the tape. This coding system has to be applied as the tape is being recorded. Thus the system cannot be used for pre-recorded tapes.

The present invention aims to provide a means of identifying video material, especially frames of a video tape but without limitation to same, but which does not require identification data to be physically recorded on the video storage media, be it a tape or other media. Another aim of the invention is to provide means of identifying a video frame or a sequence of frames which can be used with pre-recorded video storage media, be it tapes or other video storage media. It is a further aim of the invention to identify a frame or a sequence of frames from a video tape storage medium, eg a tape or other video storage media which can be used during recording thereof. Yet another aim of the present invention is to provide a means to enable automatic cataloguing and indexing of pre-recorded video media be it tape or other video storage media. Yet another aim of the invention is to provide a means of automatic identification of a video storage media from a plurality of media. Yet another aim of the present invention is to provide a better system for cataloguing video contents.

SUMMARY OF THE INVENTION

Accordingly, one aspect of the present invention proposes identifying a video storage media having regard to the contents thereof be it the visible content, the audio content or close caption data or signals recorded on a video media, and using any of said contents to generate a data sequence for identifying the video storage media and its contents.

More preferably, the contents of a video frame are used to generate a frame value which is stored in a memory. The analysis of the frame contents can take place in playback mode in the case of a pre-recorded video storage media or during recording of the video storage media. By repeating the analysis for all the frames of the video media or, less preferably a sequence of frames at known intervals, a series of frame value sequences can be created and stored in memory. The analysis of any one frame may not result in a unique value, but the analysis of a sequence of frames is less likely to be repeated. It is intended that the sequences are correlated to particular events on the storage media by a user or more preferably automatically as described further hereinafter.

On a subsequent reading of the video storage media, at any given position corresponding frame value sequences can be obtained using the same method as that used to create the frame value sequences in the first instance. The frame value sequence obtained at that particular position of the video storage media can then be compared with the frame value sequences stored in memory. This should result in a match and thereby identify the video storage media, its contents and the current position of the storage media. It is assumed that there will be some recorded frames to permit identification. Once the current position is known the storage media can be positioned at a desired location using an automatic control programme.

The invention is applicable to any medium which can be used to store video, be it magnetically or optically. Currently the most popular medium is video tape but the likes of Digital Versatile Disk (DVD) are gaining popularity. The references hereafter to tape refer to one particular application but are not to be taken as limiting.

Another aspect of the invention provides a method of generating data for identifying a video storage media, be it a video tape or other media, comprising the steps of:—

(1) generating from the contents of the media a data sequence representing the picture and/or the audio and/or data content of the video storage media, and (2) combining said data sequence with position information and/or picture and/or text and/or data or other information.

Yet another aspect of the invention proposes a method of using a data sequence or signal derived from and related to the contents of a video storage medium (hereinafter referred to as a related off-media data sequence) to determine the position and/or the contents of the video medium.

A still further aspect of the invention provides to a method of identifying a video storage medium by generating at least one data sequence from the content of the storage medium and comparing the resulting data sequence with a series of data sequences stored in memory with the aim of establishing a match or a relationship.

A yet further aspect of the invention provides an index of video storage media contents stored in electronic memory or on video storage media, and comprising a plurality of images corresponding at least in part to the contents of the video storage medium at different positions thereof, and wherein the index is adapted to be read and displayed on a television screen.

Another aspect of the invention provides a method of accessing material recorded on a video storage medium comprising recovering from memory an index of the storage medium contents and displaying on a television screen in the form of a plurality of images corresponding to different positions of the storage medium, with or without accompanying text, each image having an associated data sequence or data value which defines its position on the video storage medium and wherein selection of one of the images instigates a search for the corresponding position on the video storage medium preferably by determining the current position of the medium and comparing the resulting data sequence with a series of data value sequences stored in memory until a match is found or a relationship is established, and comparing the location thereof with the location of the selected position and instigating operation of the video player transport according to programmed control to locate the desired position.

A video frame comprises an array of pixels each having a particular value which will create the overall frame image. Whilst all of these pixels could be used to generate a frame value for example by thresholding the individual pixels and summing the result, this could be susceptible to VCR tracking artifacts at the top or bottom of the video image. Accordingly, we propose to select a reduced number of pixels and these may be from a discrete array within the overall array or from discrete positions within the overall array. For example our preferred proposal is to ignore the top 50 and bottom fifty video lines. The remaining area will be divided into blocks of pixels. Each 20×20 block contains 400 pixels, a value is computed for each block by summing all 400 pixels then dividing by 400, the resulting value for each block will be compared with the corresponding value from the previous video frame. The block that is most different from the corresponding position in the previous frame will be the block chosen to represent the current frame, its difference value and X, Y co-ordinates are stored in a memory means. This operation is continued for a sequence of frames thereby creating a frame value sequence. The resulting frame value sequence is stored in memory.

In relation to correlating frame value sequence with tape contents it is preferred that as the analysis of the frame contents is taking place to generate the frame value sequences, the actual contents of some of the frames are stored in memory. The contents stored will preferably include the visual content of at least one frame. More preferably a sequence of frame images are stored in memory. Optionally the associated audio signal is also stored. The frames which are stored are conveniently selected automatically during the analysis at spaced intervals throughout the duration of the tape—say every 5 minutes. By this means a sequence of frames representing a short snap-shot of the content of the tape at each of these positions is stored in memory. The snapshot need only be a few seconds long or may be a single still video frame. All snap-shots or still images are preferably stored in memory to enable a plurality of them to be simultaneously displayed on a television monitor. Programming software is provided to achieve this. A remote hand set provides a convenient means of selecting available options from an on-screen menu, including the facility to review the associated sequence of frames stored in memory or to commence viewing the video at a position corresponding to the image displayed. This is achieved by an automatic playback facility which utilises the above described frame analysis to compare the current position of the video tape with the desired position (corresponding to the frame value sequence assigned to the selected frame) and operate the video cassette transport preferably using the I/R control commands under programmed CPU control to operate fast forward, rewind and play modes until the desired location is obtained. The preferred operation is in conjunction with VCR characterisation data discussed in our earlier application in relation to utilization of tape position information to achieve automatic tape control.

The resulting lead image for the plurality of snap-shots of a tape will provide the viewer with an overview of the entire contents of the tape. The images may occupy more than one screen depending on the length of the tape and the frequency of the images. Forward and back commands are available to review all the recorded frames of the tape in question. By taking the snap-shots at regular intervals the viewer can assess the duration of any particular item and the space available for recording other items. For a tape of three hours duration—snapshots every 5 minutes may be deemed sufficient. The programming software and associated options menu may allow the user to add text to the images—for example content related information such as a title—or optical character recognition (OCR) software running on the CPU can be employed to automatically extract program information from the video images. If only part of the tape has been recorded, the frame analysis procedure will identify unused tape portions. This allows the system under direction of the user to advance the tape to an unrecorded location to commence a new recording. More preferably the programming menu provides for sections of tape which are blank or which can be recorded over, to be marked permitting an auto record function. The associated control circuitry can use the frame position information to compute the duration of any recording and the space available for subsequent recording.

Providing a visual representation of the tape contents provides a better system for cataloguing the video contents. The cataloguing and indexing of pre-recorded video cassettes can be done automatically. After analysis, pictures, text and data related to the video media contents are preferably automatically written to a memory means. Said data preferably includes the amount of blank media available for recording new material.

Existing set top boxes allow electronic programming guides to be imported and the information to be displayed on screen. Some programming options also allow the user to mark programs of interest and the software will generate a reminder, usually an on-screen reminder, so that the user can change to the appropriate channel. Other systems will automatically trigger actuation of a video cassette recorder. However, the user has to ensure that a tape is in place and that it is in a suitable place for recording to commence, i.e. to ensure that there is sufficient space for the intended recording without recording over any material of interest.

By utilising the tape position information and the indexing instruction and associated programming software and in conjunction with the imported electronic program data, the duration of a program to be recorded and the available space, for example as a tape, can be correlated and the viewer presented with appropriate information and if there is insufficient unrecorded space an option for recording over existing material or inserting another tape.

Accordingly another aspect of the invention provides an on-screen display of tape contents retrieved from memory and comprising a plurality of images retrieved from different portions of the tape in question and/or any text or data relating thereto.

More particularly associated VCR control circuitry operates in conjunction with tape position information determined from reading the tape and correlated with data stored in memory regarding the position of each of said images to position the tape at a position corresponding to the location of a selected one of the images. More particularly still, the memory contains information on the contents of a plurality of tapes which contents can be displayed selectively. The contents of the tape displayed may be selected manually or automatically. Automatic selection is achieved by placing a video tape in an associated VCR and reviewing a sequence of frames to generate a frame value sequence which is compared with frame value sequences stored in memory, when a match is found the relevant information is displayed.

Another aspect of the invention provides a closed loop video recorder or other media device control system for determining the status of a video recorder or other media device, consisting of the steps of, (1) issuing a play command or code or sequence, (2) verifying that signals or data are received, (3) using said signals or data or absence of signals or data to determine if said video recorder or other media device is powered on.

Preferably the closed loop control system further comprises the steps of, (1) checking that the tape or media position is substantially unchanged from a predetermined position, (2) issuing a record command or code or sequence. More preferably still, the closed loop control system further comprises the step of verifying the signals or data received from said video recorder or other media device correspond to a selected program designated for recording.

Yet another aspect of the invention provides a system for controlling a video recorder or other media device for selective enabling and disabling of associated functions, comprising the steps of, (1) periodically assessing the presence or content of signals and/or data output from said video recorder or other media device to determine if device is operating, (2) determining if said video recorder or other media device is scheduled and/or permitted to operate at time of assessing signals and/or data, (3) if required issuing a command or code or sequence to disable said video recorder or other media device by a power off command and/or a stop command and/or a pause or other command.

Yet another aspect provides a graphical user interface adapted to display information relating to television program content and/or data content from other sources such as the Internet and video recorder or other media device content, wherein selections are made from said television program content and/or data content from other sources from recording onto video tape or other media whereby calculation of available free space on said video tape or other media is displayed and whereby if insufficient space is available for recording original selections may be modified and/or some or all or the video tape or other media contents may be selected for overwriting.

Preferably the graphical user interface is adapted to display the status of items recorded on video tape or other media as to whether the recorded item has been viewed. More preferably the graphical user interface is adapted to display information relating to one or more video tapes or other media contents, wherein the contents of said video tape or other media is displayed either graphically (could be video frames) or texturally according to the category of the recorded material, said category could be the type of recorded material or whether the item is suitable for a particular age of viewer or whether the items have been viewed or any other criteria.

A still further aspect of the invention provides a graphical user interface adapted to display information relating to television program content and/or data content from other sources such as the Internet and/or video recorder or other media device content, wherein said display information comprises a visual representation such as a picture indicating the contents of said television program content and/or data content from other sources such ad the Internet and/or video recorder or other media device content.

More preferably the graphical user interface is adapted to display television program content information by category such as what is currently showing and/or what will be showing next and/or what is showing that day and/or what will be showing that week. Preferably, the visual representation is downloaded from the program provider and stored in memory. Preferably the graphical user interface is further adapted to filter said television program content by category of user preferences such as channel number or type of television program or other category.

A yet still further aspect of the invention provides a video recorder or other media device index generation method comprising the steps of, (1) recording a television broadcast, (2) recording in a memory means a copy of subtitling or closed caption data, (3) using said subtitling or closed caption data to search for key words or phrases to identify a scene from one or more video tapes or other media corresponding to said key word, (4) issuing a command or code or sequence to position said video tape or other media at the scene corresponding to said key word.

BRIEF DESCRIPTION OF THE DRAWINGS

The present invention will now be described further by way of example only with reference to the accompanying drawings in which:—

FIG. 3 illustrates diagrammatically part of a video frame showing how it is made up of pixels, FIG. 4 is a diagram representing the lines produced by an analogue television signal, FIG. 5 is a formula for generating a value block of 20×20 pixels, FIG. 6 is an illustration of block arrays for two video frames, FIG. 7 is an illustration of one block array.

DETAILED DESCRIPTION OF THE DRAWINGS AND PREFERRED EMBODIMENTS

The various aspects of the invention will be described hereinafter, by way of example only, in relation to an application where the video storage media is a video cassette tape. Their application to other video storage media will be apparent to one skilled in the art.

Figure 1:
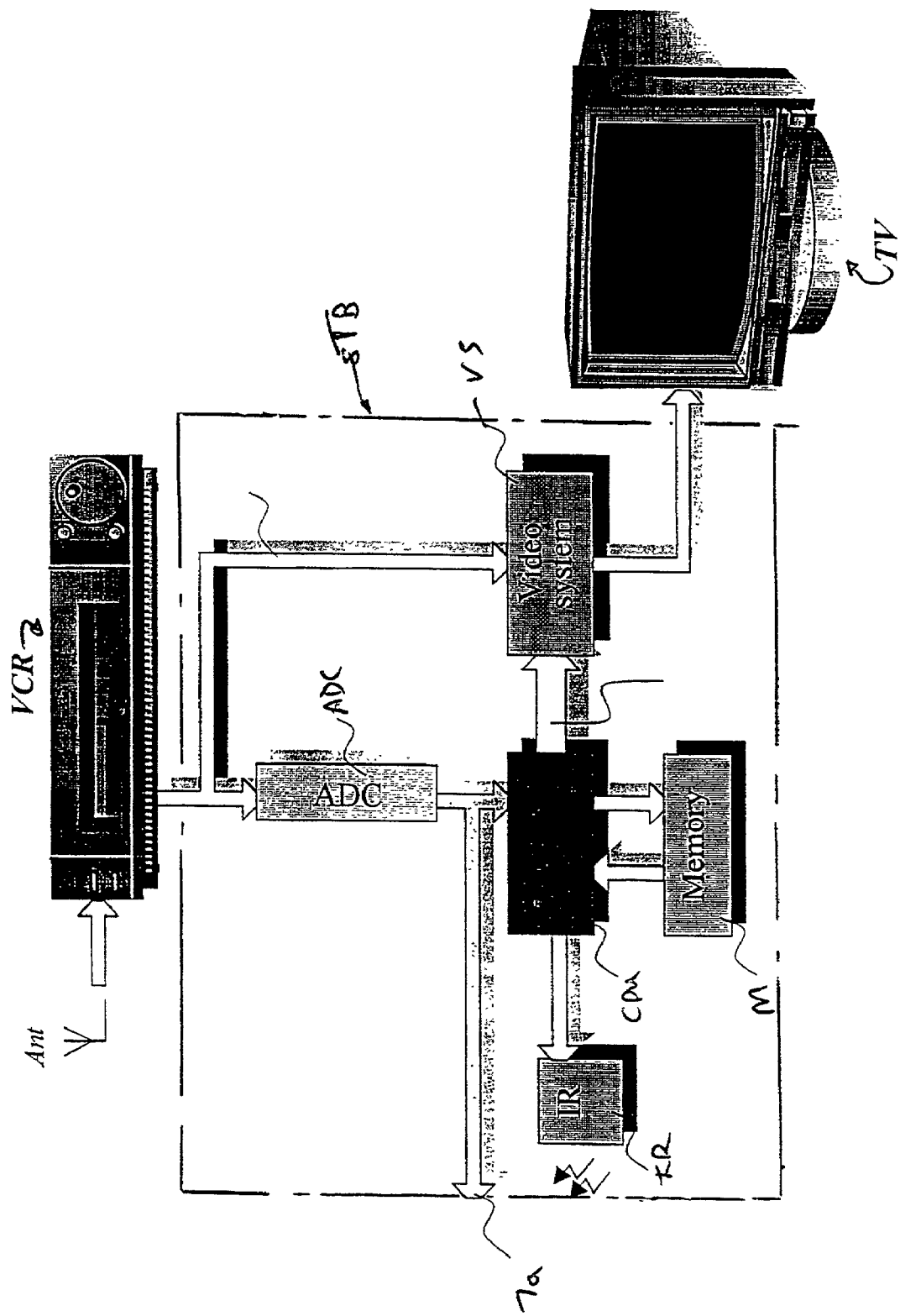
FIG. 1 illustrates in simplified block diagram of the present system.

Referring firstly to FIG. 1, illustrated pictorially is a video cassette recorder VCR, and a television TV and in block form within the dotted outline STB various of functional units. These functioned units conveniently form part of a set top box, but could be incorporated within either the video cassette recorder or the television or any other associated hardware. The functional units comprise an analogue digital converter ADC, a central processing unit CPU, a memory M, a video system VS and an infra-red control unit IR. This configuration corresponds substantially to that disclosed in our earlier patent application in relation to controlling tape position, storing details of tape contents and utilising on-screen displays to review tape contents and to select an appropriate positions for replay or recording of a tape. These aspects are not described further hereinafter as they are discussed fully in our earlier patent application.

Figure 2:
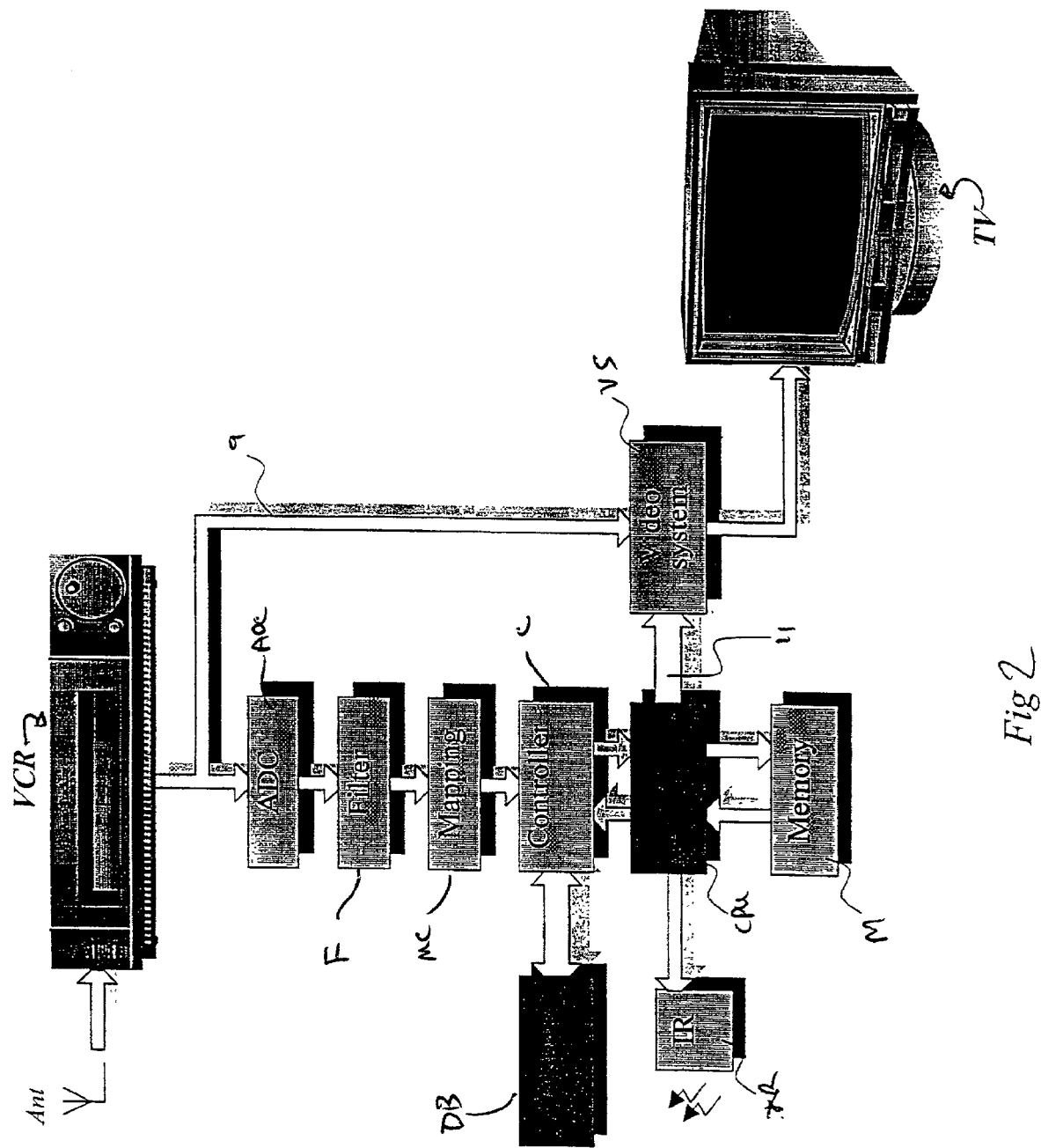
FIG. 2 is a more detailed block diagram showing the mapping to frame sequence values feature.

FIG. 2 shows all the apparatus features of FIG. 1 plus the further functional units required to determine the frame values and to subsequently determine tape position. The further functional units comprise a mapping circuit MC, a filter circuit F, a data base DB, and a controller C. The operation will be described further hereinafter.

Figure 8:
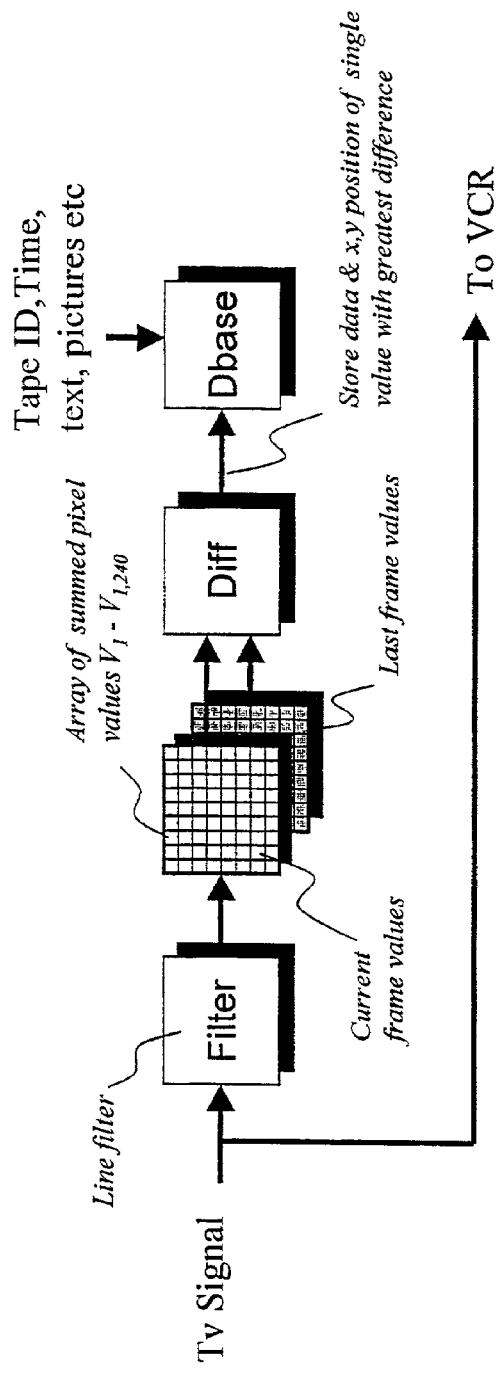
FIG. 8 is an illustration of the processes used when recording new video material or analysing a pre-recorded tape.

In FIG. 3 we illustrate part of a video frame comprising a 625×800 pixel array designated $X_1, X_2, X_3, \ldots X_{800}$ and $Y_1, Y_2, Y_3 \ldots Y_{625}$. Any particular pixel can be defined using xy coordinates. In a preferred method of generating a frame value we select blocks of 20×20 pixels, each block is assigned a value according to the formula illustrated in FIG. 5 representing a single video frame. These values are then compared with the corresponding values generated for the previous video frame as illustrated in FIG. 6. The value that has changed the most compared to the previous frame and the X, Y co-ordinates thereof are stored in Dbase memory of FIG. 8 along with pictures and information representing the tape, its position and other information such as picture, text or data. Subsequent frames or groups of frames are similarly analysed as shown in the flow chart of FIG. 10 until a data sequence has been formed that represents the entire video tape. This sequence can be generated during record or for pre-recorded tapes by playing the tape and analysing its contents.

Figure 9:
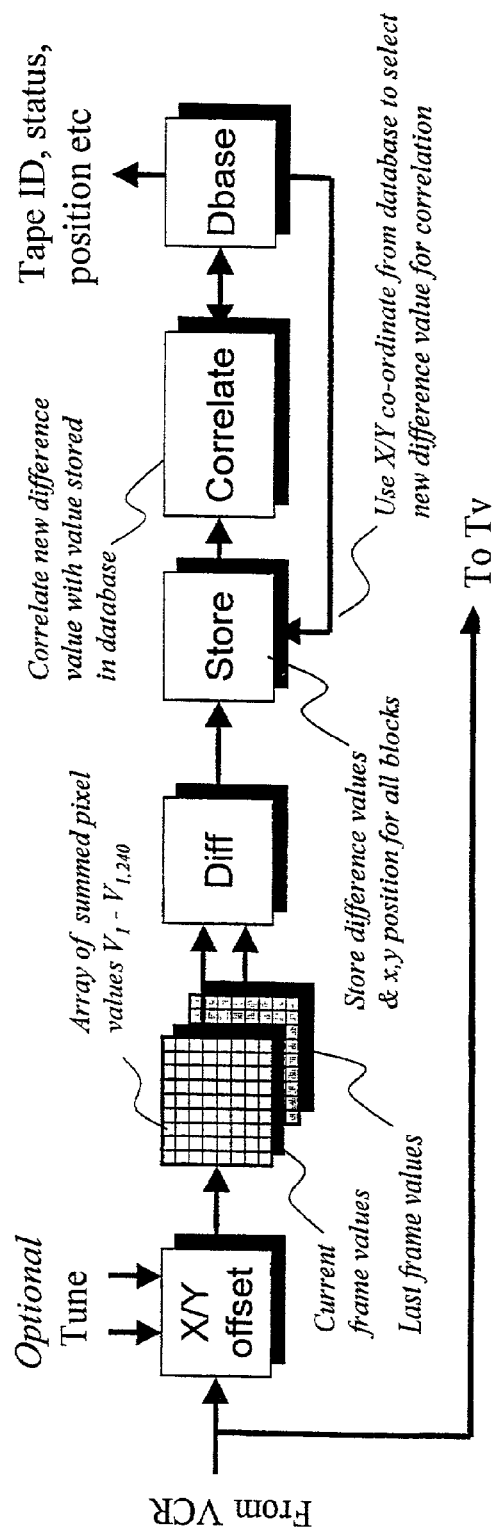
FIG. 9 is an illustration of the processes used for identifying a tape and its contents.
Figures 10, 11:
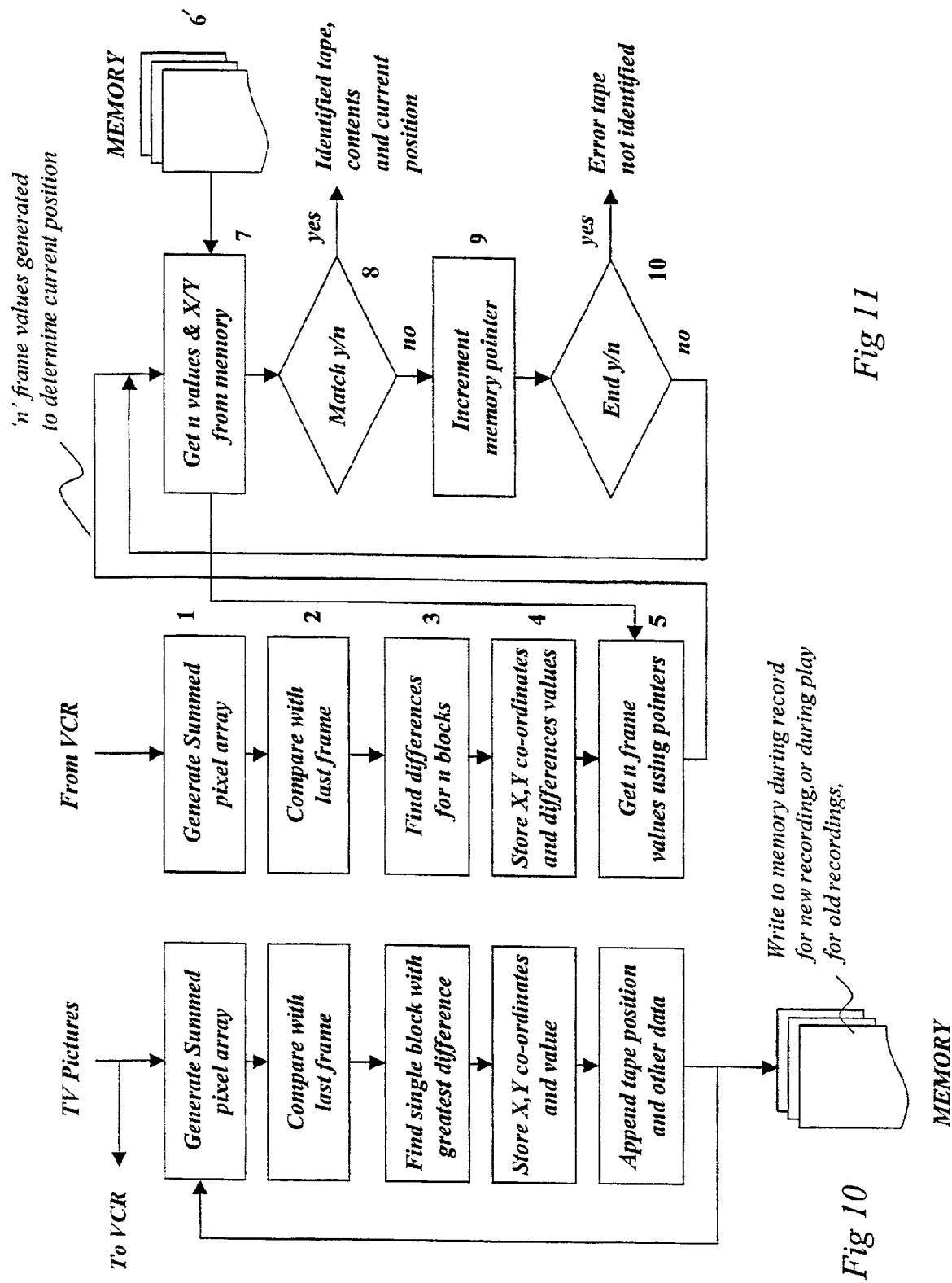
FIG. 10 is an illustration of the steps involved in analysing a tape and creating a data base in memory.
FIG. 11 illustrates the steps involved in identifying a tape.

FIG. 9 and the flow chart of FIG. 11 illustrate the process of identifying a tape, its contents, status and position. Signals from the VCR can be compensated for horizontal or vertical offsets by the XY offset prior to entering the calculation of summed pixel blocks according to FIG. 5 and array blocks of FIG. 9. Difference values are again calculated, but here all or most values are retained and stored in Store of FIG. 9 for comparison with previously calculated single frame values in Dbase memory. The comparison process consists of extracting from Dbase memory of FIG. 9 the X, Y co-ordinates of the best value stored according to the processes of FIG. 8. These co-ordinates are used to index the current difference value from Store of FIG. 9, its value is extracted and compared to the corresponding value held in Dbase memory of FIG. 9. This process is repeated for a sequence of values until the best match is found. A best matching sequence is used to extract further information from the Dbase memory to indicate the tape, its contents, position and pictures text or data.

Figure 12:
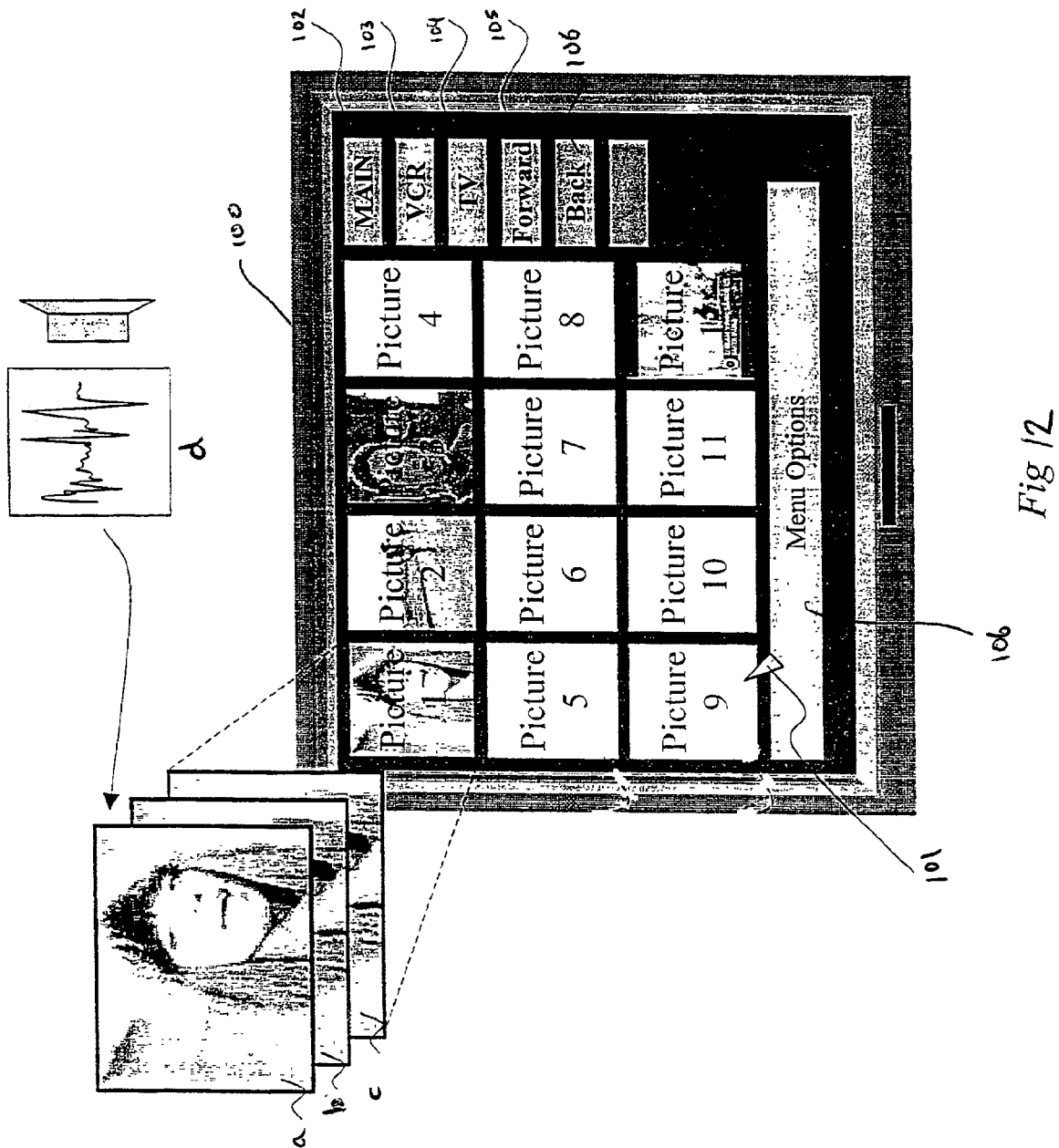
FIG. 12 illustrates one embodiment of screen display.

Referring now to FIG. 12, when it is desired to utilize the likes of an automatic tape positioning mechanism to transport the tape to a desired location it is first necessary to identify the tape which is loaded into the video cassette recorder and its contents and the current position of the tape so that the desired position can be achieved with the minimum of user interference. Thus the first step is to generate a sequence of frame values from the tape. This is performed automatically by the system and follows steps 1 to 4 of FIG. 11 and is represented by store of FIG. 9. Once a frame sequence has been obtained this has to be compared with the frame sequences stored in memory in order to find a match. Thus at step 7 the controller selects a first frame value sequence from those stored in memory. One such frame value sequence is represented diagrammatically at 6'. At this stage the computer is merely concerned with the frame value sequence. In practice other information will be appended to that record, for example program identification data. In any event its location in memory may be used to indicate the relative position of the identified section of tape. The frame value sequence retrieved from memory is compared at Step 8 with that obtained from the tape. If there is a match then the tape has been identified and an appropriate display initiated. Usually this will be details of the contents on that tape. If no correlation has been found the search continues. Step 9 represents incrementing of a memory pointer so that when Step 7 comes around next time, the next frame value sequence is recovered from memory. Step 10 checks to see whether the last frame value sequence has been reached and aborts the search if yes and causes an appropriate message to be displayed. If not, then the search continues on an incremental basis working through all the frame values sequences stored in memory (see loop 11) until either a match is found at Step 8 or the stored memory sequences have been searched and no match found in which case the sequence is aborted and an appropriate message is generated for example error or tape not identified.

Figure 14:
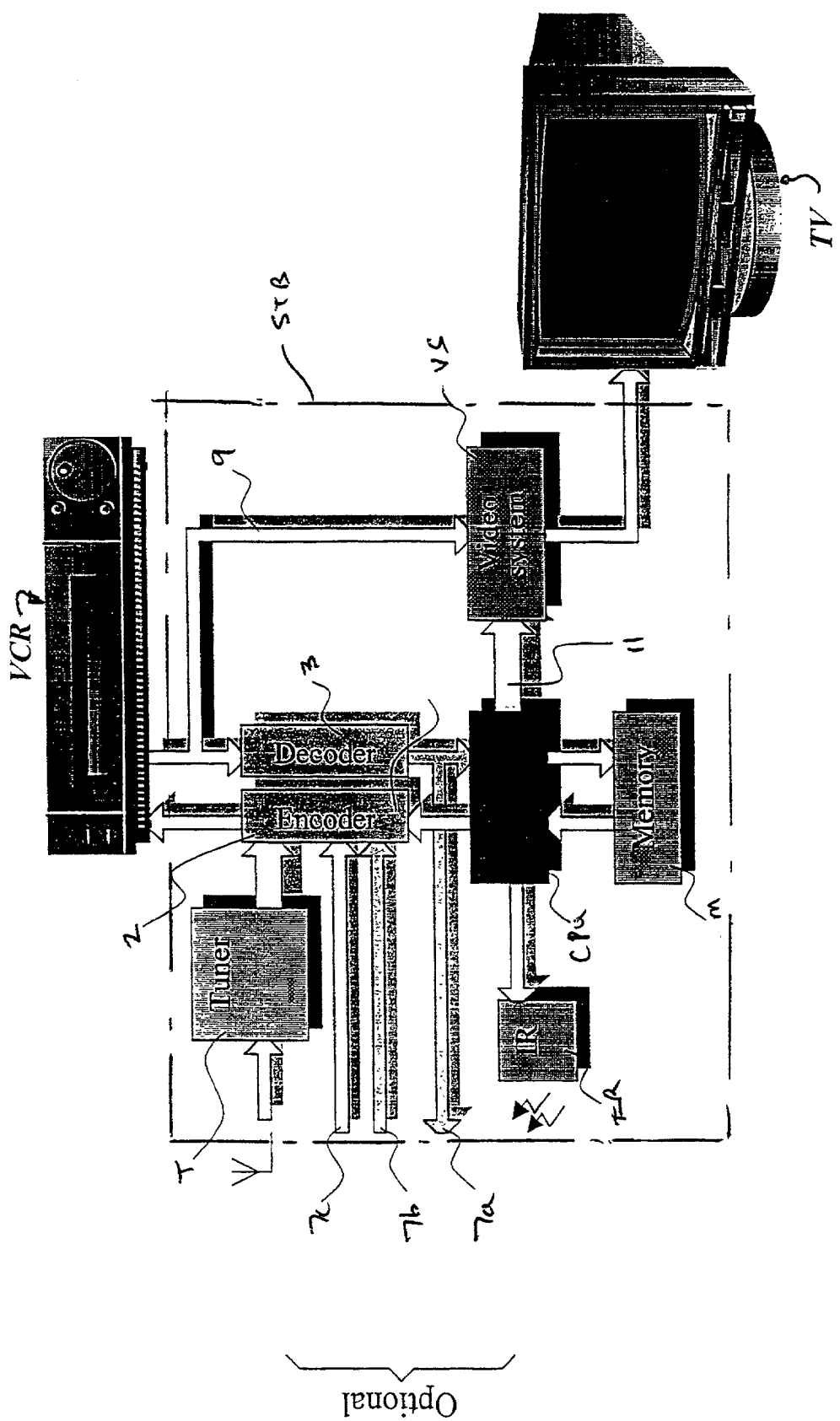
FIG. 14 illustrates in simplified form another apparatus for implementing the described invention.

There is now described the creation of a table of contents for a tape which may be used to advantage in conjunction with the afore-described tape position information. FIG. 14 illustrates apparatus which has all the features of the apparatus of FIGS. 1 and 2 and hence it is not described in any detail in those respects. Corresponding reference numerals have been used to denote corresponding parts. Thus the afore-described controller database, adc, mapping filter circuitry can be regarded as part of the CPU and a encoder 2. Also illustrated is, a decoder 3, a tuner T, an output line 7a and input lines 7b and 7c.

The tuner is provided for decoding television signals for viewing on the T.V. or recording on the VCR. Line 7b provides an optional input for an external video signal and line 7a provides an optional input for external data such as a phone line which may be connected to an Internet site. Line 7a is an optional decoded data output.

In analysing the frames of the video to determine the frame value sequences, the actual contents of whole frames both video and audio is also preferably written to memory at periodic intervals. In fact this could be done independently of calculating frame value sequences where it is merely desired to create a useful tape index independent of tape position information. For example where automatic tape control is not required. Alternatively other methods of tape position could be used. More particularly, for example every 5 minutes of tape play time, a sequence of frames are recorded in memory. More preferably these will have appended to them the relevant frame value sequences or other tape position data. The number of frames stored in memory may be sufficient to play a few seconds of the recorded material or just a single video frame.

This results in the creation of a table of contents for the tape which is represented by what can be conveniently termed a plurality of snap-shots of the tape contents taken at discrete intervals throughout the tape. Preferably the lead image will have a sequence of further images associated with it corresponding to the next few seconds of frames. The lead images are stored in memory so that they can be displayed on screen simultaneously or at least a plurality thereof, for example in a format as illustrated in FIG. 12. Displayed on the screen 100 are twelve pictures. In this example pictures 4-11 are blank. Some of the sequence of frames associated with picture 1 are shown at b and c. An associated audio signal is shown at d. Shown displayed at the fight hand side of the screen 100 at 102-106 and along the bottom at 107 are some control menu options. These are described further hereinafter.

It will be understood that the memory M contains characterisation data for the VCR as well as details of the tape contents and the control program. The CPU runs the software. Selection of the options displayed on screen is by movement of cursor 101 controlled by a remote key pad or by a mouse. Clicking on 105 or 106 enables the viewer to see more screens of tape images. These may be for the same tape where there are more images than can be accommodated on one screen or they may be for the contents of other tapes which are stored in memory. Moving the cursor over one of the images displayed will play the associated sound and/or frame sequence. Clicking on a picture instigates an auto play command which utilises the available tape position data and the VCR transport controls to locate the chosen frame on the tape and commence replaying of the tape. When tape position data is not recorded on the tape the above discussed technique of calculating frame value sequence is used to determine the current position and thereafter to locate the desired position as otherwise discussed in our earlier patent application.

Figure 13A:
FIGS. 13a and 13b illustrate two screen display options.
Figure 13:
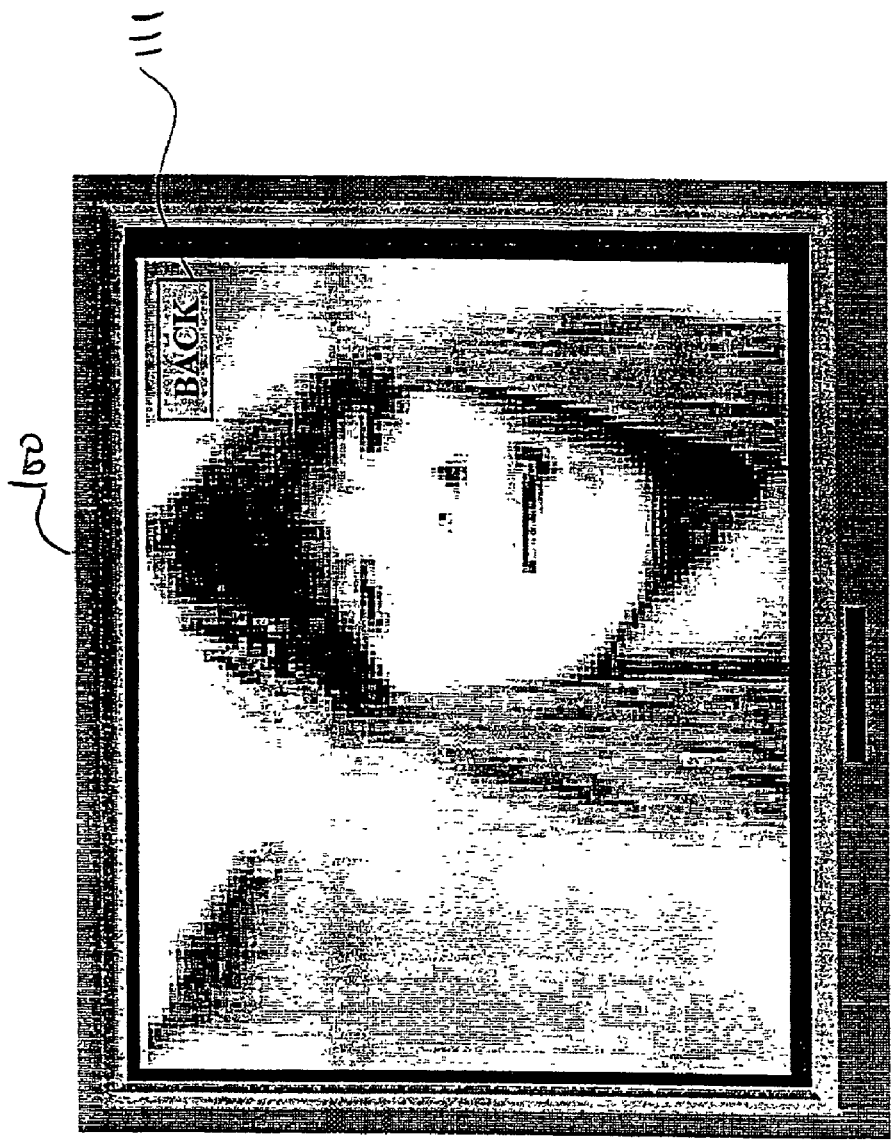

On switching to VCR play or replaying of the sequence from memory, an alternative screen display is adopted as shown in FIG. 13*a*. The user has the option to go to a full screen display as shown in FIG. 13*b* by clicking on 108 and thereafter to revert to the display of FIG. 13*a* by clicking on 111. Clicking on 109 stops the play mode. Clicking on 110 reverts to the index display with so called thumbnail pictures.

Other options on the index display include selection of TV guide or VCR screen—see 104 and 103 respectively. Other options with regard to record functions can be achieved through the menu options which are not described further herein.

The audio track or Closed Caption data could alternatively be used to generate data sequences that identify a tape and its contents. Closed Caption data is already in a digital form and could be correlated with tape position data in the memory Dbase. For audio signals the phase of the audio component is usually corrupted by the VCR recording and play back circuits. Auto-correlation is a well known technique that can be employed to place the audio components into a predetermined phase relationships for pattern matching. Closed Caption data could also be deployed for automatic titling. It should be obvious to one skilled in the art how other techniques such as hamming codes could be applied to generate data sequences representing audio, picture or data content of the video tapes. It is not intended to limit the scope of this patent to storing difference values based on summing pixels, or to video cassettes.

Where automatic control provisions exist the programming circuitry includes means to determine the status of the media device to verify that it is switched on when so required and to check that the video media is in the appropriate position and that the selected material to be recorded is being recorded. When record functions have been selected to be initiated automatically at some future time, means is provided to disable the operation of the device, in the meantime.

Where items are recorded on video tape, means is provided to indicate visually to the viewer whether they have been viewed, thereby indicating for example whether they are available for recording over.

As regards the contents of the video tape which are stored in memory, it is advantageous if the index includes a facility for categorization of the program material. Conveniently means is provided for displaying the contents of a selected category.

The facility to store images representing the content of a video medium—e.g. any one tape, in the form of a visual representations as described hereinabove can be extended to program providers so that electronic program guides may include such visual representation of program currently being shown or to be shown at a future date. The images for any one or for all or a plurality of programmes currently being shown could be displayed on screen and from which a user would make a program viewing or recording selection. Again the program material may advantageously categorized and means provided to display only a selected category or categories.

Subtitles or closed caption data may be stored as part of the program contents of recorded media and means provided to search same to identify and display media contents in that category.

The invention claimed is:

1. A closed loop video recorder or other media device control system for determining the status of a video recorder or other remote media device, the system comprising a status subsystem to (1) issue signals or data comprising a play command or code or sequence, (2) perform a verification that said signals or data are received by the video recorder or other remote media device, and (3) use said verification or an absence of said verification to determine if said video recorder or other remote media device is powered on, wherein the status subsystem checks whether the tape or media position is substantially unchanged from a predetermined position, and issues a record command or code or sequence in response thereto.

2. A closed loop video recorder or other media device control system for determining the status of a video recorder or other remote media device, the system comprising a status subsystem to (1) issue signals or data comprising a play command or code or sequence, (2) perform a verification that said signals or data are received by the video recorder or other remote media device, and (3) use said verification or an absence of said verification to determine if said video recorder or other remote media device is powered on, wherein the status subsystem verifies whether the signals or data received from said video recorder or other remote media device correspond to a selected program designated for recording.

3. A method for controlling a video recorder or other remote media device for selective enabling and disabling of associated functions, comprising the steps of: (1) periodically assessing the presence or content of signals and/or data output from said video recorder or other remote media device to determine if the device is operating, (2) determining if said video recorder or other remote media device is scheduled and/or permitted to operate at the time of assessing the signals and/or data, (3) if required, issuing a command or code or sequence to disable said video recorder or other remote media device by a power off command and/or a stop command and/or a pause or other command, and (4) checking that a tape associated with the video recorder or a media position associated with the other remote media device is substantially unchanged from a predetermined position to determine if the video recorder or other remote media device has been operated since the predetermined position.

4. The method as claimed in claim 3 further comprising the step of verifying whether signals or data received from the video recorder or other remote media device correspond to a selected program designated for recording.

\* \* \* \* \*

UNITED STATES PATENT AND TRADEMARK OFFICE
CERTIFICATE OF CORRECTION

PATENT NO. : 7,343,081 B1  
APPLICATION NO. : 09/744055  
DATED : March 11, 2008  
INVENTOR(S) : Kenneth Austin Page 1 of 1

It is certified that error appears in the above-identified patent and that said Letters Patent is hereby corrected as shown below:

Column 3, line 22: --X, Y co-ordinates are stored-- to "X, Y coordinates are stored"

Column 5, line 56: --sources such ad-- to "sources such as"

Column 6, line 65: --appropriate positions for replay-- to "appropriate position for replay"

Column 8, line 60: --the fight hand side-- to "the right hand side"

Column 9, lines 65: --representations as described-- to "representation as described"

Column 10, lines 7-9: --Again the program material may advantageously categorized and means provided to display only a selected category or categories.--

Please change the sentence to the following:

"Again the program material may advantageously be categorized and means are provided to display only a selected category or categories."

Signed and Sealed this

Seventeenth Day of February, 2009

JOHN DOLL  
*Acting Director of the United States Patent and Trademark Office*